Jan. 1, 1924. 1,479,510
W. H. MORGAN ET AL
COMBINED DIE AND MOLD
Filed Sept. 20, 1922 2 Sheets-Sheet 1
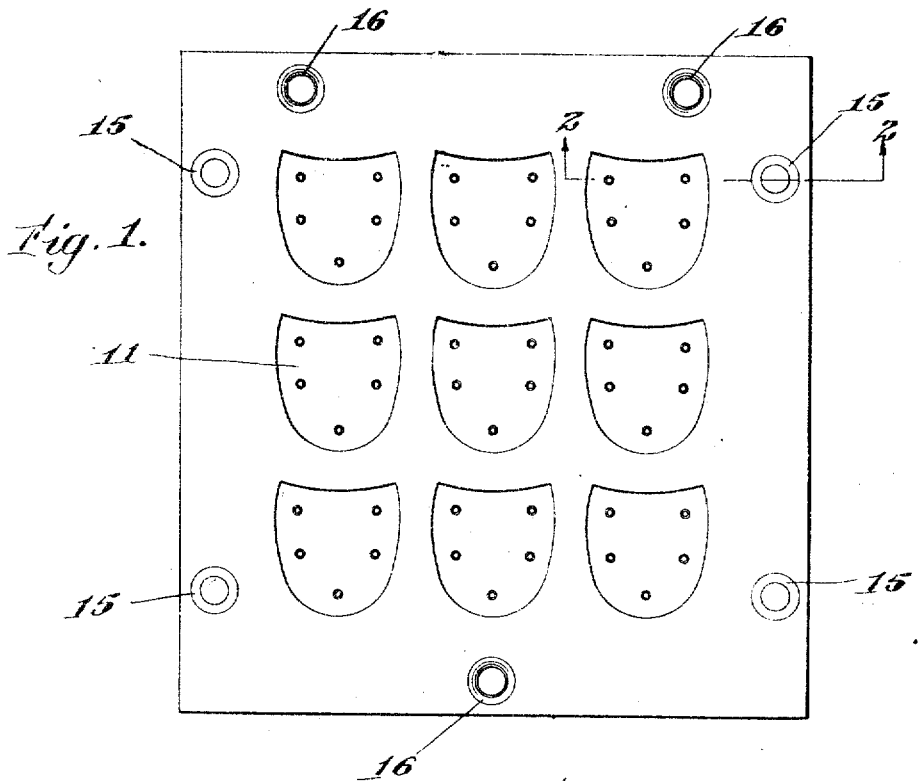
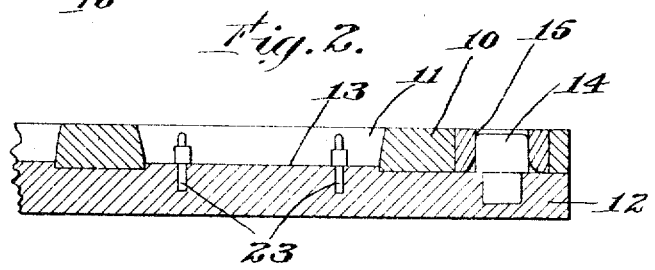
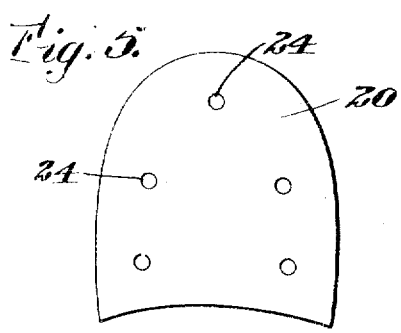
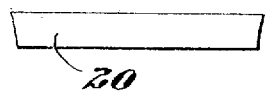
Inventors
William H. Morgan
Johan Fredrik Brunell
by James R. Hodder
Att'y

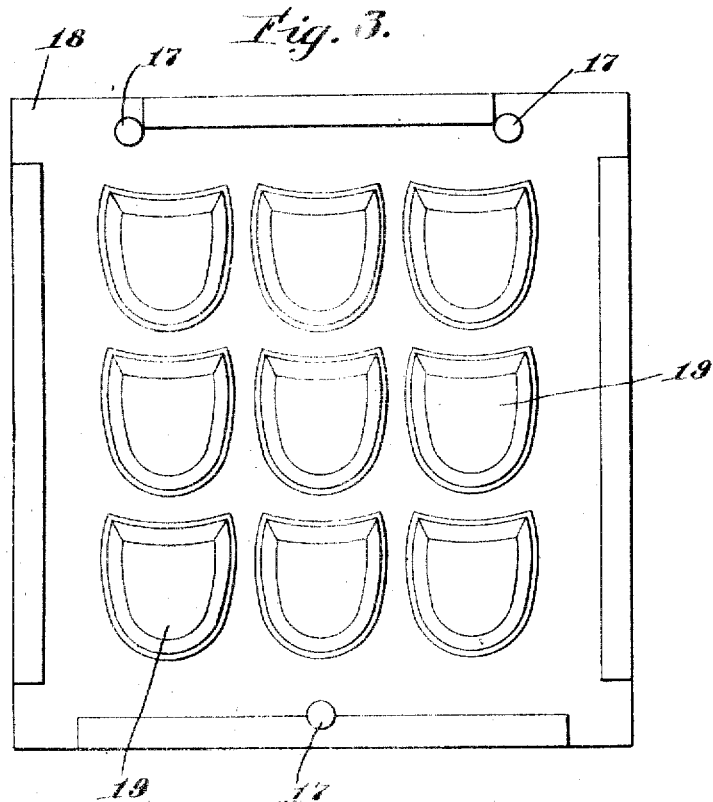
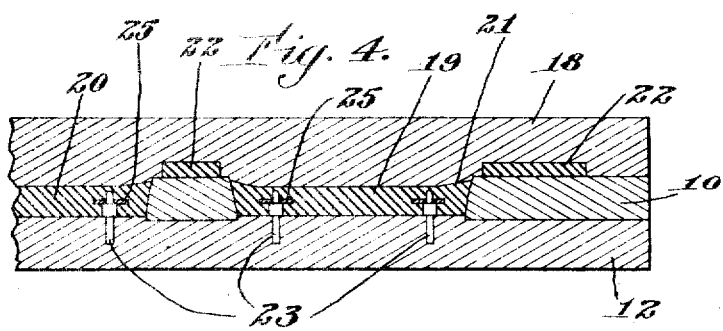

Patented Jan. 1, 1924.

1,479,510

UNITED STATES PATENT OFFICE.

WILLIAM H. MORGAN AND JOHAN FREDRIK BRUNSELL, OF DORCHESTER, BOSTON, MASSACHUSETTS.

COMBINED DIE AND MOLD.

Application filed September 20, 1922. Serial No. 589,483.

*To all whom it may concern:*

Be it known that we, WILLIAM H. MORGAN, a citizen of the United States, and a resident of Dorchester, Boston, in the county of Suffolk and State of Massachusetts, and JOHAN FREDRIK BRUNSELL, a resident of Dorchester, Boston, in the county of Suffolk and State of Massachusetts, have invented an Improvement in Combined Dies and Molds, of which the following description, in connection with the accompanying drawings, is a specification, like letters on the drawings representing like parts.

Our present invention relates to dies or molds, and more particularly to an improved combined die and mold adapted particularly for the economical production of rubber heels and the like.

Heretofore rubber heels in the process of manufacture have had to undergo several distinct and independent operations, this being due primarily to the fact that, because of the different grades of rubber and the different pressures to which the rubber was subjected during the dieing out or molding operation an excess of rubber over and above the capacity of the mold employed had to be used, which excess rubber appeared in the semi-finished product as a fin of varying and variable thickness and extent, which fins had to be cut away from the heel or other product by a separate operation. We have, in our improved combined die and mold, been enabled to eliminate this objectionable fin that was heretofore deemed necessary and have produced a combined die and mold in which an excess of rubber may be employed, this excess of rubber in the dieing operation flowing into a prepared cavity and entirely removed or separated from the heel proper. By eliminating the fin, we eliminate the heretofore necessary operation of removing the same and are thus enabled to produce a rubber heel or other like article composed of molded or moldable material at but a single operation, the finished article being, in this respect, a better article than the one heretofore produced by a plurality of manufacturing processes.

The principal object of our invention, therefore, is an improved combined die and mold for successfully dieing and molding articles of molded or moldable material such, for example, rubber heels.

Other objects and novel features of the construction and arrangement of parts comprising our improved combined die and mold will appear as the description of such apparatus progresses.

In the accompanying drawings illustrating the preferred embodiment of our invention, Fig. 1 is a plan view showing the bottom and middle plates of our combined die and mold in position;

Fig. 2 is a fragmentary vertical cross sectional view taken in the line 2—2 of Fig. 1;

Fig. 3 is a bottom plan view of the top plate of our improved combined die and mold;

Fig. 4 is a fragmentary vertical sectional elevation of the bottom, middle, and top plates of our improved combined die and mold showing the manner in which the various elements combine and also the manner in which the excess of rubber is separated from the molded and died article;

Fig. 5 is a plan view of a finished rubber heel, and

Fig. 6 is an end elevation thereof.

Referring to the drawings, 10 designates a middle plate provided with a plurality of openings or orifices 11 of the proper shape and size for the rubber heel or other article to be made, this middle plate 10 being also of a thickness slightly greater than the desired thickness of such heel. This middle plate 10 fits onto, and cooperates with, a bottom plate 12 that is provided with a plurality of upstanding portions 13 of a shape and size similar to the shape and size of the holes or perforations 11 in the middle plate 10 so that, when the middle plate 10 and bottom plate 12 are assembled in operative relation to each other, as shown in Fig. 3, the upstanding portions 13 extend upwardly a sufficient distance into the holes or perforations 11. Secured to the bottom plate 12 and extending upwardly therefrom is a plurality of pins 14 which register with the holes in a plurality of bushings 15 secured in the middle plate 10, these pins 14 and bushings 15 insuring proper alining of the middle and bottom plates 10 and 12 respectively. The middle plate 10 is also provided with a plurality of bushings 16 in which fit pins 17 that are secured in the under face of a top plate 18, this top plate 18 being provided with a plurality of downwardly extending portions 19 of a shape and size similar to the shape and size of the holes or perforations 11 in the middle plate 10 and adapted, when the top plate 18 is brought into close association with the middle plate 10, to extend slightly below the upper surface of such middle-plate, as clearly shown in Fig. 4, the portions 19 cooperating with the contour of the holes or perforations 11 to cut off from the main body of the rubber heel 20 that is to be molded any excess of rubber, or other moldable material that may be employed, that is forced out of the holes or perforations 11 by the downwardly extending portions 19. The spaces between the downwardly extending portions 19 form a reservoir or pocket into which the excess of rubber or other moldable material of which the rubber heels are composed flows as the upper plate 18 moves into position or close association with the middle plate 10. The downwardly extending portions 19 are flared outwardly, as shown at 21, to facilitate the flow of excess material, and such excess material is represented in Fig. 4 by the numeral 22.

Each upstanding portion 13 of the bottom plate 12 is provided with a plurality of pins 23 equal in number to the number of perforations 24 it is desired to provide in the finished rubber heel 20, and on these pins 23 are temporarily placed metallic washers 25, as shown in Fig. 4.

In operating our improved combined die and mold it is assumed that the bottom, middle, and top plates 12, 10, and 18 respectively, are separate from each other, and the first step necessary is the placing of washers 25 on the pins 23. The middle plate 10 is then placed in position on the bottom plate 12, as shown in Fig. 2, after which the holes or perforations 11 in the middle plate 10 are filled with the moldable material and the top plate 18 then placed loosely in position on the middle plate 10, the registering of the pins 17 of such top plate with the bushings 16 in the middle plate insuring a proper registering of the downwardly extending portions 19 with the upper end of the holes or perforations 11. Pressure is now applied to the top plate 18, it being assumed that the bottom and middle plates are resting on a substantial support, and as the top plate 18 approaches the middle plate 10, the moldable material is compressed to make a heel 20 of the proper thickness, any excess of material that may have been in such holes or perforations 11 flowing out into the space between the downwardly extending portions 19, this excess of material being designated in Fig. 4 by the numeral 22. The edges of the downwardly extending portions 19 cooperate with the upper edge of the holes or perforations 11 to cut such excess of material from the finished rubber heel which is thus completed in a single operation.

Our invention has been described as applied to the economical manufacture of rubber heels by a single combined molding and dieing operation, but it is to be understood that our improved combined die and mold is applicable to the economical production of other articles than rubber heels that are composed of molded or moldable material.

Having thus described our invention, what we claim as new is:

An improved combined die and mold comprising a bottom plate, an upstanding member formed integral therewith and of any desired shape, an intermediate member provided with a mold cavity of a shape and size similar to the upstanding member on the bottom plate and registering with said bottom plate to define a mold of suitable depth, a top plate cooperating with the intermediate plate and provided with a downwardly extending member formed integral therewith and of a size and shape similar to the upper edge of the mold cavity in the middle plate, the downwardly extending member movable toward the bottom plate to compress molded or moldable material held in the mold cavity in the middle plate and to cause a flow of excess material outwardly therefrom, the edge of such downwardly extending portion cooperating with the upper edge of the mold cavity in the middle plate to cut or shear excess material from the molded or moldable material as the members are brought into association with each other.

In testimony whereof, we have signed our names to this specification.

WILLIAM H. MORGAN.
JOHAN FREDRIK BRUNSELL.